(12) United States Patent
Grauer, Jr. et al.

(10) Patent No.: US 9,195,471 B1
(45) Date of Patent: Nov. 24, 2015

(54) TECHNIQUES FOR INITIATING FUNCTIONALITY OF AN ELECTRONIC DEVICE

(71) Applicant: Amazon Technologies, Inc., Reno, NV (US)

(72) Inventors: Arthur John Grauer, Jr., Seattle, WA (US); Sasha Mikhael Perez, Seattle, WA (US); Scott L. Boggan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 14/012,140

(22) Filed: Aug. 28, 2013

(51) Int. Cl.
*G06F 3/00* (2006.01)
*G06F 3/01* (2006.01)
*G06F 9/44* (2006.01)

(52) U.S. Cl.
CPC .................................... *G06F 9/4401* (2013.01)

(58) Field of Classification Search
CPC .................................................... G06F 9/4401
See application file for complete search history.

(56) References Cited

U.S. PATENT DOCUMENTS

| | | | |
|---|---|---|---|
| 8,004,498 B1 * | 8/2011 | Meridian | 345/173 |
| 8,046,721 B2 * | 10/2011 | Chaudhri et al. | 715/863 |
| 8,639,295 B2 * | 1/2014 | Hsieh et al. | 455/566 |
| 2009/0006991 A1 * | 1/2009 | Lindberg et al. | 715/763 |
| 2014/0223322 A1 * | 8/2014 | Slack et al. | 715/740 |
| 2015/0106756 A1 * | 4/2015 | Jitkoff et al. | 715/765 |

OTHER PUBLICATIONS

Shawnvw, Power door locks, Nov. 21, 2008, http://chevroletforum.com/forum/silverado-fullsize-pick-ups-21/power-door-locks-19090/.*

* cited by examiner

*Primary Examiner* — Mark Connolly
(74) *Attorney, Agent, or Firm* — Lee & Hayes, PLLC (57) ABSTRACT

Initiating a functionality of an electronic device using the device cover and/or other device inputs is described herein. In some implementations, a sequence of operations may be stored on the device to initiate a specific functionality of the device. Each operation in the sequence may correspond to a manipulation of a position of a device cover or an input from a device input component. Once the device determines that two or more received operations complete the stored sequence, the specific functionality of the device may be initiated.

20 Claims, 9 Drawing Sheets

| Operations For Sequences 1-(N) | Device Functionality |
|---|---|
| Sequence 1:<br>Time Period (Optional): Default<br>    Operation A: Open Cover Flap A<br>        Time Period (Optional): None<br>    Operation B: Close cover Flap A<br>        Time Period (Optional): None<br>    Operation C: Open Cover Flap B<br>        Time Period (Optional): None<br>    Operation D: Close cover Flap B<br>        Time Period (Optional): None<br>    Operation E: Open Entire Cover<br>        Time Period (Optional): >2 Seconds<br>    Operation F: Close Entire Cover<br>        Time Period (Optional): None<br>    Operation G: Open Cover Flap B<br>        Time Period (Optional): None<br>    Operation H: Close cover Flap B<br>        Time Period (Optional): None<br>    Operation I: Open Entire Cover | Sequence 1: Change Device from a Locked State the An Unlocked State |
| Sequence 2:<br>Time Period (Optional): < 7 Seconds<br>    Operation A: Open Cover Flap B<br>        Time Period (Optional): None<br>    Operation B: Close cover Flap B<br>        Time Period (Optional): None<br>    Operation C: Change Device Orientation<br>        Time Period (Optional): None<br>    Operation D: Close cover Flap B<br>        Time Period (Optional): None<br>    Operation E: Press Volume Up Button X3<br>        Time Period (Optional): None<br>    Operation F: Open Entire Cover<br>        Time Period (Optional): None | Sequence 2: Launch Web Browser |
| ... | ... |
| Sequence N:<br>Time Period (Optional): | Sequence N: Launch Email |

Sequence Setting Module
312

TECHNIQUES FOR INITIATING FUNCTIONALITY OF AN ELECTRONIC DEVICE

BACKGROUND

Device screen covers are used with various electronic devices. Traditional device screen covers provide a convenient way of protecting the electronic device while the device is not in use. However, these traditional device screen covers typically do not increase or otherwise augment functionality of the associated electronic devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for initiating electronic device functionality using a device cover. For instance, a user may manipulate a cover associated with the electronic device in a particular sequence to change the device from a locked state to an unlocked state. However, in other implementations, manipulation of the cover may result in launching alternative device functionality. For example, manipulation of the cover in a specific sequence may cause the device to launch a specific application and/or content stored on the device or may initiate an input/output functionality of the device (e.g., camera, microphone, speakers, etc. . . . ).

In some implementations, the electronic device may include a transformable cover with multiple flaps able to fold or flex in multiple directions. In these instances, the cover may include one or more magnets at various points configured to temporarily fasten the cover to corresponding points on the electronic device. In one implementation, where the cover is a transformable cover, each of the multiple flaps may contain a magnet. Each magnet, when in contact with its corresponding magnetic point on the electronic device, would result in the device or cover generating a signal notifying one or more modules within the device that the corresponding flap is closed. Alternatively, when a magnet is separated from the corresponding magnetic point on the electronic device, the device or cover may transmit a signal notifying the one or more modules within the device that corresponding flap is open. In some implementations, the user may manipulate each of the multiple flaps in a preset sequence to create a particular sequence of generated signals and, correspondingly, initiate electronic device functionality.

In some implementations, the signal notifying the device that the corresponding flap is opened or closed may be created by near field communication (NFC) between the cover and the electronic device, radio-frequency identification (RFID) and/or light sensors. In other implementations, the magnets may be located within the electronic device and configured to correspond to one or more magnetic point on the cover.

In other implementations, the electronic device may include a cover with a single planar flap. Again, the user may manipulate the cover in a predefined sequence to initiate electronic device functionality, such as transitioning the device to or from a locked state. For instance, a user may open and/or close the single-flap cover in a certain manner over a certain period of time to generate a signal effective for transitioning the device. For example, the predefined sequence of actions to create the signal may include the user quickly opening the cover, slowing closing the cover, keeping the cover closed for approximately two seconds slowly opening the cover and then quickly closing the cover. This sequence (e.g., identified by a change in magnetism at the cover's edge) may result in the generation of a signal instructing the device to transition to the locked state.

In some implementations, the device includes one or modules for storing sequences. For example, the one or more modules may receive input from a user defining a sequence to initiate a specific functionality of the device. In this example, the sequence may include a plurality of flips in a particular order of the multiple flaps of the transformable cover, and once completed, may initiate or launch a game application stored on the device, or may cause the device to take other actions.

In other implementations, other device characteristics (i.e., device orientation) and/or inputs (i.e., capacitive event sensor, camera, microphone, and hardware buttons) may be stored as an operation in the preset sequence to initiate electronic device functionality. For example, placing the device in a landscape orientation may be part of the preset sequence to initiate electronic device functionality. In another example, a preset sequence may include manipulation of the each of the multiple flaps of a cover in addition to receiving a capacitive event on the display of the device (e.g., a touch at a particular location and/or for a particular amount of time on a touch-sensitive display).

In some implementations, the entire preset sequence must be completed within a predetermined period of time. In some implementations, the predetermined period of time may be based on the number of operations or steps of the preset sequence. For example, if the preset sequence contains a larger number of operations, the predetermined period of time would be correspondingly longer. In other implementations, the converse may be true. In some implementations, a period of time may be associated with each operation in the preset sequence. For example, if an operation in the preset sequence includes lifting a flap of the cover a desired period of time may be associated with that operation. In this example, in order for the operation to register as an operation within the preset sequence, the flap would have to remain lifted for the desired period of time.

The techniques for unlocking or otherwise triggering functionality of an electronic device using the device cover may be implemented in many ways. Example implementations are provided below with reference to the figures.

Figure 1A:
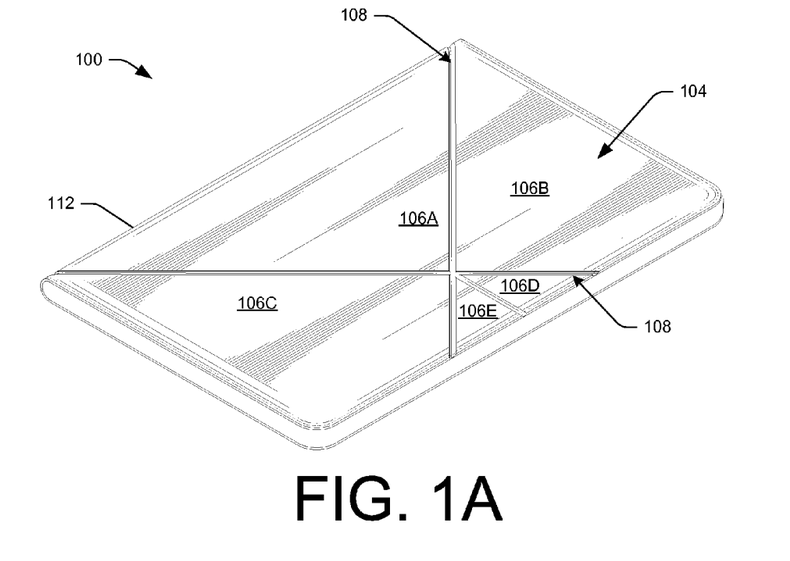
FIGS. 1A and 1B illustrate perspective views of a front surface and a back surface of an example transformable cover in a closed position.
Figure 1B:
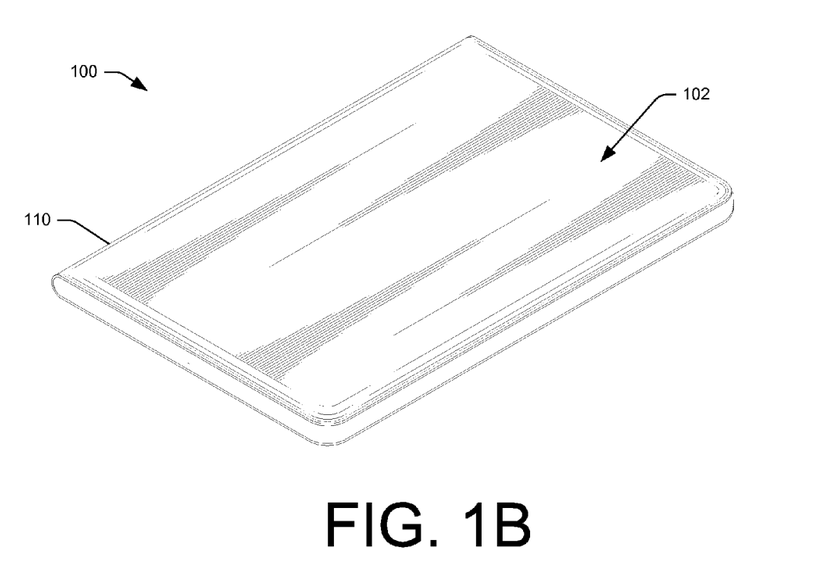

FIGS. 1A and 1B are an illustrative example of a transformable cover 100 which may be used to unlock an electronic device. FIG. 1A is a perspective view of a front surface 102 of the transformable cover 100. While, FIG. 1B is a perspective view of a back surface 104 of the transformable cover 100.

In some implementations, transformable cover 100 may include a front surface 102, and a back surface 104 pivotably coupled to the front surface 102. The back surface 104 may comprise a substantially planar sheet of material which defines a perimeter of the back surface. The front surface 102 may comprise multiple substantially planar flaps of material 106(A)-(E) (collectively referred to as 106) which collectively define a perimeter of the front surface 102.

In some implementations, the multiple substantially planar flaps 106 of the front surface 102 are flexibly coupled together in a way that allows the flaps 106 to pivot or fold relative to one another along fold lines 108. In one implementation, the multiple substantially planar flaps 106 are coupled together by a flexible material that at least partially surrounds or covers the multiple substantially planar flaps 106. By way of example and not limitation, the flexible material may comprise natural or synthetic fabric or sheets of material, foam, leather, faux leather, plastic, rubber, combinations of these, or other flexible materials. In some implementations, the flaps of substantially planar material 106 may comprise separate individual pieces of material bonded, adhered, stitched, co-molded, ultrasonically welded, or otherwise affixed to the flexible material. In that case, the flexible material serves the dual purposes of holding the substantially planar flaps of material 106 in position relative to one another and of allowing the substantially planar flaps of material 106 to fold relative to one another along fold lines 108 and along a spine coupling the front surface 102 and the back surface 104 of the transformative cover 100. Additionally or alternatively, the multiple substantially planar flaps 106 may be joined directly to each other by stitching, sonic welding, adhesive, or the like.

In another implementation, the multiple substantially planar flaps 106 may be formed integrally and the fold lines 108 may represent score lines, thinned sections of material, perforations, weakened sections, living hinges, or other features designed to allow the multiple substantially planar flaps 106 to fold relative to one another.

An edge 110 of the front surface 102 is pivotably coupled to an edge 112 of the back surface 104 at the spine of the transformable cover 100. In one implementation, the edge 110 of the front surface 102 is pivotably coupled to the edge 112 of the back surface 104 by a flexible material that at least partially surrounds the front surface 102 and the back surface 104. In another implementation, the front surface 102 and the back surface 104 may be formed integrally and may be pivotable relative to one another around score lines, thinned sections of material, perforations, weakened sections, or other features designed to allow the front surface 102 to pivot relative to the back surface 104.

Figure 2:
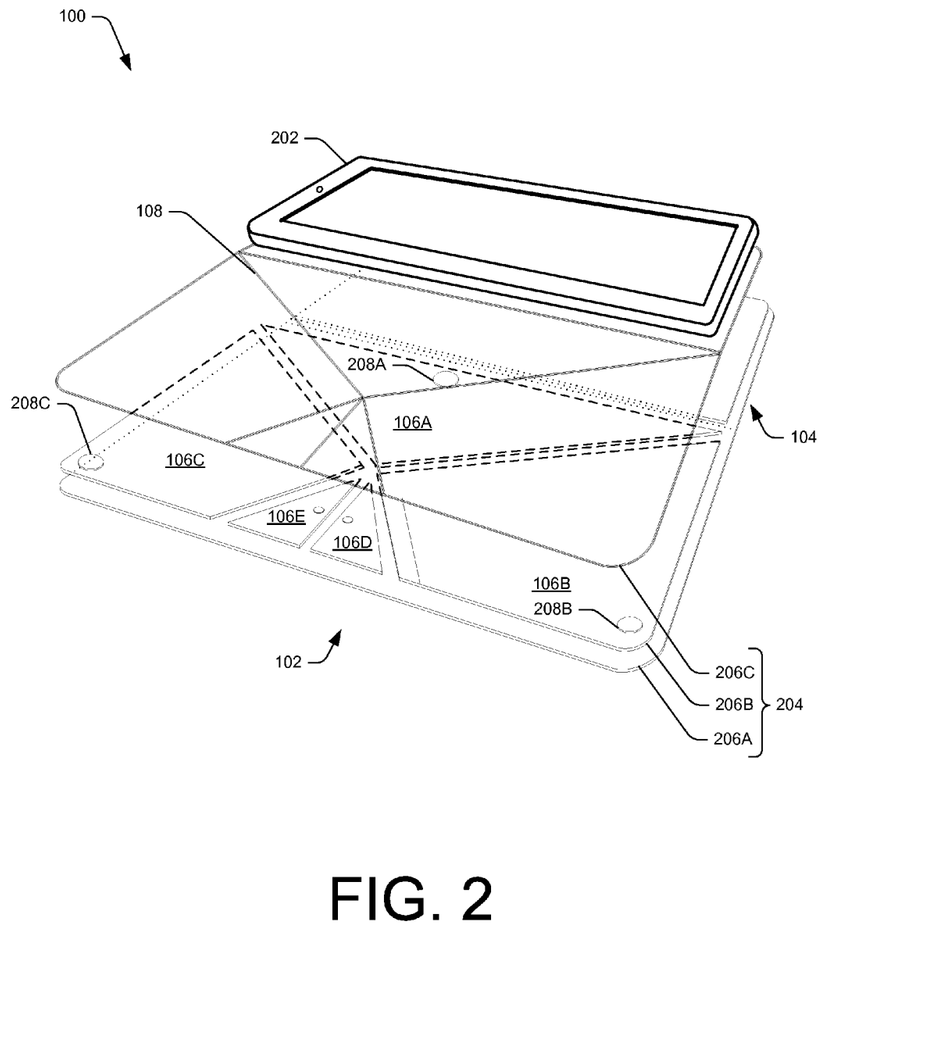
FIG. 2 illustrates an exploded perspective view of an example transformable cover in an open position.

FIG. 2 illustrates an exploded view of example layers of transformative cover 100. FIG. 2 also illustrates an example electronic device 202 upon a layer of the back surface 104 within transformative cover 100. Electronic device 202 is illustrated as a tablet computing device. However, in other implementations, the electronic device may be a smart phone, electronic book (eBook) reader device or the like.

As illustrated in FIG. 2, transformable cover 100 includes a first side 204 with multiple layers 206(A)-(C). The combination of the multiple layers 206(A)-(C) substantially comprise the multiple substantially planar flaps 106. As described above, the multiple substantially planar flaps 106 of the first side 204 are flexibly coupled together in a way that allows the flaps 106 to pivot or fold relative to one another along fold lines 108. In some implementations, one or more of the flaps 106 may comprise a magnetic disc. FIG. 2. illustrates magnetic discs 208(A)-(C) embedded within the first side 204 on layer 206B of flaps 106(A)-(C). Each magnetic disc may be configured to interact with electronic device 202 while the first side 204 of the transformative cover is placed in contact with electronic device 202.

In some implementations, the magnetic discs 208(A)-(C) may interact with the bezel and/or an area on the display screen of the electronic device.

Figure 3:
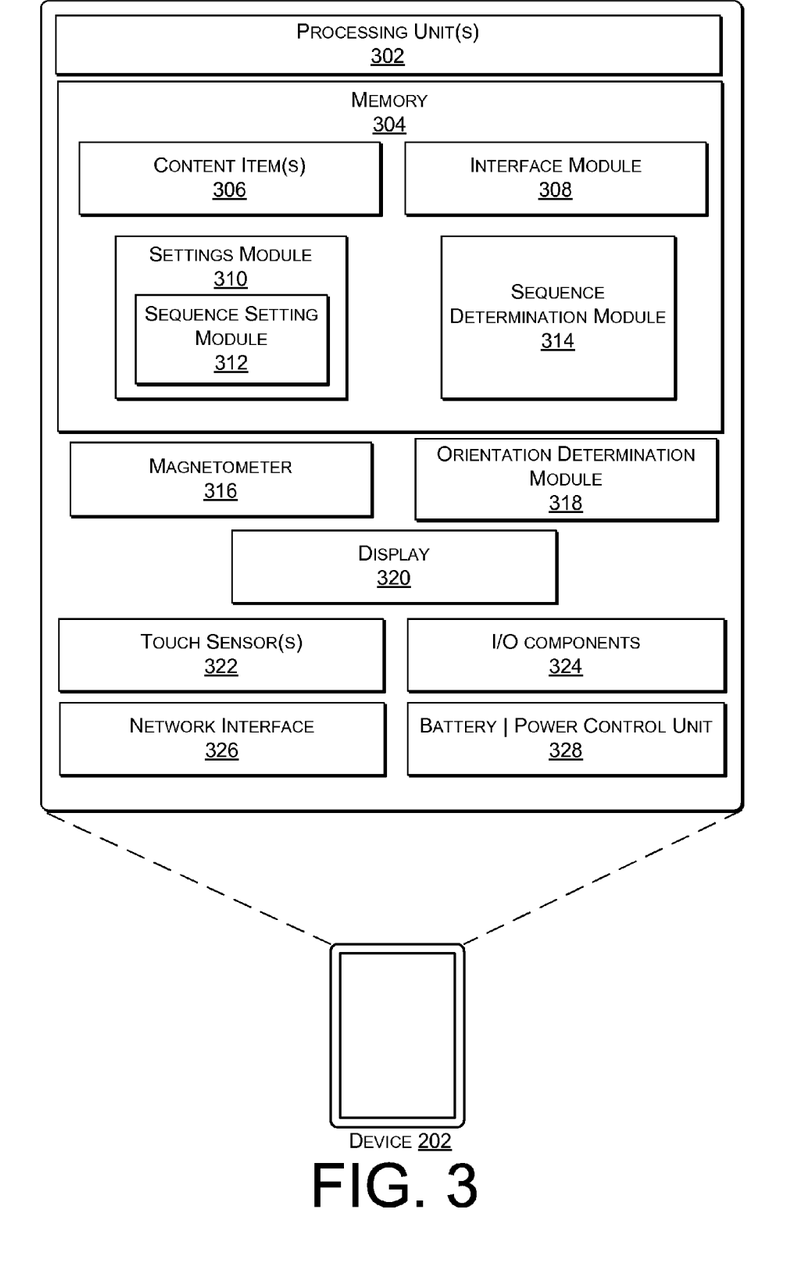
FIG. 3 illustrates selected components of an example electronic device, including a sequence settings module and a sequence determination module.

FIG. 3 illustrates the example electronic device 202 which may be used with a cover described herein to unlock the electronic device. The basic configuration of device 202 includes one or more processing units 302 and memory 304. Depending on the configuration of the device 202, the memory 304 (and other memories described throughout this document) is an example of computer storage media and may include volatile and nonvolatile memory.

Thus, the memory 304 may include, but is not limited to, RAM, ROM, EEPROM, flash memory, or other memory technology, or any other medium which can be used to store media items or applications and data which can be accessed by the device 202.

The memory 304 may be used to store any number of functional components that are executable on the processing unit(s) 302, as well as data and content items that are rendered by device 202. Thus, the memory 304 may store an operating system and a storage database to store one or more content items 306, such as eBooks, audio books, songs, videos, still images, and the like.

An interface module 308 may also be provided in memory 304 and may be executed on the processing unit(s) 302 to provide for user operation of device 202. The interface module 308 may facilitate textual entry of requests (e.g., via a cursor, controller, keyboard, etc.), audible entry of requests (e.g., via a microphone), or entry of requests in any other manner.

The memory 304 may also include a settings module 310 to facilitate personalization of device 202 to the user. For example, settings module 310 may store device registration, device name, Wi-Fi settings, device password, and the like. In some implementations, the settings module 310 may include a sequence setting module 312. The sequence settings module 312 may store a user's desired cover opening sequence for unlocking device 202. In other implementations, the setting module may allow a user to store another operation sequence including the cover and/or other input/output components that when received by the device may implement some functionality of the devices. In yet another implementation, the sequence settings module 312 may be preset with manufacturer set sequences to initiate device functionality. Sequence settings module 312 is illustrated in FIG. 3 as within settings module 310; however, in other implementations, the sequence settings module 312 may be a separate module for the settings module 310.

A sequence determination module 314 may also be provided in memory 304 and may be executed on the processing unit(s) 302 to determine, based on the one or more signals received by a magnetometer 316 and/or an orientation determination module 318, whether the one or more signals correspond to a specific preset sequence and a predetermined timeframe (such as a sequence and timeframe stored in the sequence settings module 312). If so, the module 314 may initiate a change in the functionality of the device 202. For example, if the received signals match the specific sequence and are within the predetermined timeframe stored in the sequence settings module 312, the device 202 may be moved from a locked state to an unlocked state. In other implementations, if the received signals match the specific sequence and are within the predetermined timeframe, the device may be configured to open a specific content item 306, application, input/output (I/O) components 324 (described below) and/or notifications (e.g., email alerts, text alerts, calendar update, game notification, etc.).

A magnetometer 316 may also included in device 202 to receive one or more signals from each of the magnetic discs embedded within the layers of the front surface of a cover when the cover is in contact with device 202. In some implementations, magnetometer 316 may also determine a time since each of the magnetic discs have been in contact with device 202.

In some implementations, device 202 may include an orientation determination module 318 for determining the orientations of the electronic device 202. For example, the orientation determination module 318 may determine whether the device is in the portrait or landscape position. In some implementations, the orientation determination module 318 may also send one or more signals to various other components of the electronic device indicating a present orientation of the device. In some implementations the orientation determination module 318 may include an accelerometer and/or a gyroscope.

FIG. 3 further illustrated that the device 202 may include a display 320, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

Additionally, device 202 may include touch sensor(s) 322, which enables a user of device 202 to operate and interact with device 202 via touch gestures. In one implementation, the touch sensor(s) 322 may be placed behind, on top of, or integral with a touch screen layer of display 320, such that user input through contact or other gestures relative to the display 104 may be sensed by the touch sensor(s) 322. In another implementation, the touch sensor(s) 322 may be placed in another part of device 202. For example, the touch sensor(s) 322 may be placed on a device bezel, sides of the device, and/or the back of the device. In some instances, the touch sensor(s) 322 and the display 320 are integral to provide a touch-sensitive display that displays a user interface, applications, or content items and allows users to navigate via touch inputs. In some instances, the touch sensor(s) 322 are capable of detecting touches as well as determining an amount of pressure or force of these touch inputs.

The device 202 may further be equipped with various input/output (I/O) components 324. Such components may include various user interface controls (e.g., buttons, a joystick, a keyboard, etc.), a camera, a bar code reader, an image projector, audio speakers, a microphone, connection ports, and so forth.

A network interface 326 supports both wired and wireless connection to various networks, such as cellular networks, radio, Wi-Fi networks, short range networks (e.g., Bluetooth), IR, and so forth. The device 202 also includes a battery and power control unit 328. The battery and power control unit operatively controls an amount of power, or electrical energy, consumed by the device. Actively controlling the amount of power consumed by the device may achieve more efficient use of electrical energy stored by the battery.

The device 202 may have additional features or functionality. For example, the device 202 may also include additional data storage devices (removable and/or non-removable) such as, for example, magnetic disks, optical disks, or tape. The additional data storage media may include volatile and non-volatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer readable media.

Figure 4:
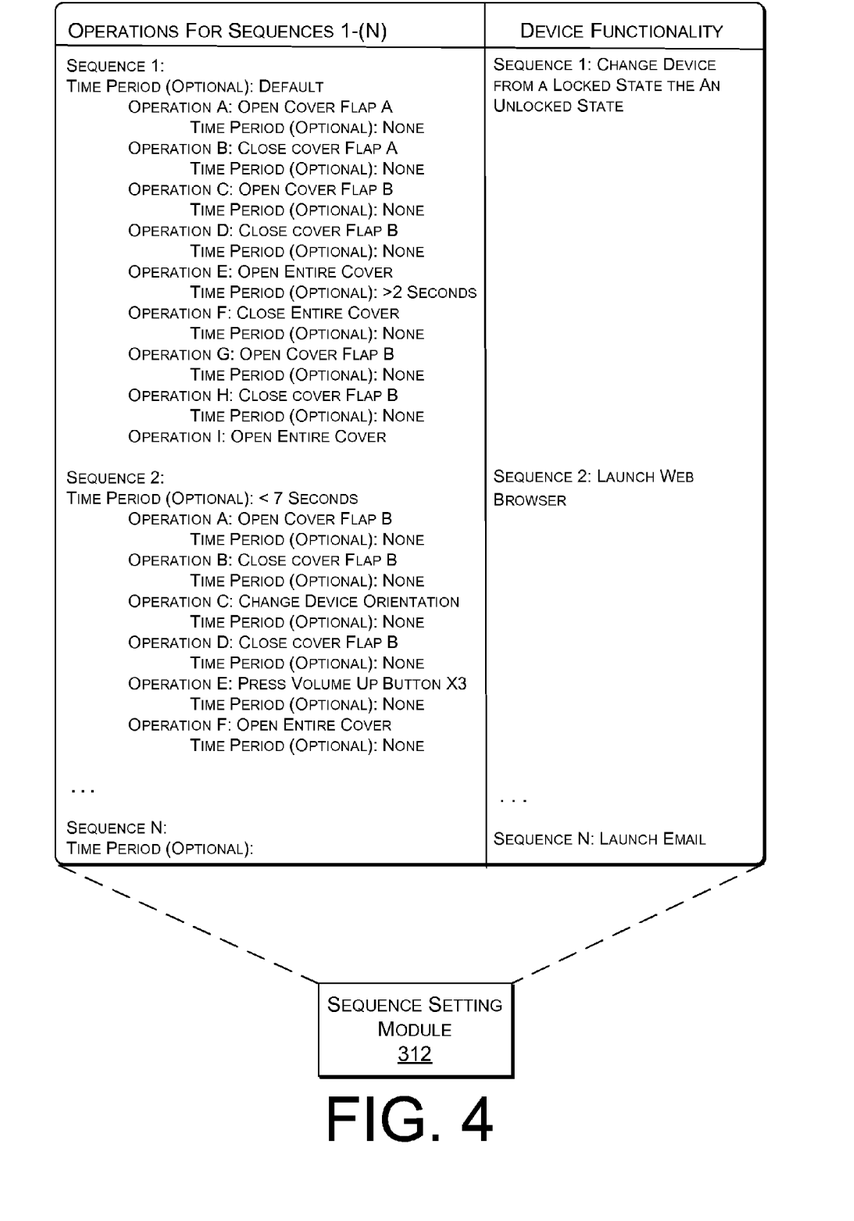
FIG. 4 illustrates example sequences stored in the sequence settings module.

FIG. 4 illustrates an example sequence settings module 312 stored in the memory of electronic device 202. As illustrated sequence setting module 312 may be configured to store a plurality of sequences and resulting device functionality for the completion of each sequence. Sequence settings module 312 is illustrated as storing sequences 1-N. In some implementations, the sequence settings module 312 may store any number of sequences.

As illustrated in FIG. 4, each of the sequences stored in the sequence setting module 312 may include one or more operations used to complete a sequence. In addition, the sequence settings module 312 stores a time period for completing each of the one or more operations or a time period for completing the entire sequence. For example, Sequence 1 is set to a default time period. In some implementations, the default time period for completing the entire sequence may be 10 seconds or less. In this implementation, if the final operation of the sequence is not completed within the time period, the associated device functionality of the sequence is not initiated.

Sequence 1 stored in the sequence setting module 312 comprises operations A-I. The completion of the operations A-I in the order and manner described changes the device from a locked state to an unlocked state. As mentioned above, each operation in the sequence may be associated with a time period. For instance, Operation E in sequence 1 comprises a step of opening the entire device cover. Furthermore, the time period for this operation has been designated as greater than two seconds. This means that opening the entire device cover as operation E must span a time period of more than 2 seconds.

As shown in FIG. 4, sequence 2 comprises operations A-F. Each operation of the sequences stored in the sequence settings module 312 may be an input such as changing a position of a cover or a portion of the cover; changing the orientation of the device, pressing a button associated with the device, for example. Additionally, each of the sequences stored in the sequence settings module may be associated with a desired functionality upon completion of the operations of the sequence. For example, sequence 1 is associated with unlocking the device, sequence 2 is associated with launching a web browner on the device, and sequence 3 is associated with launching an email application on the device. In other implementations, other functionality may be associated with a sequence.

Figure 5A:
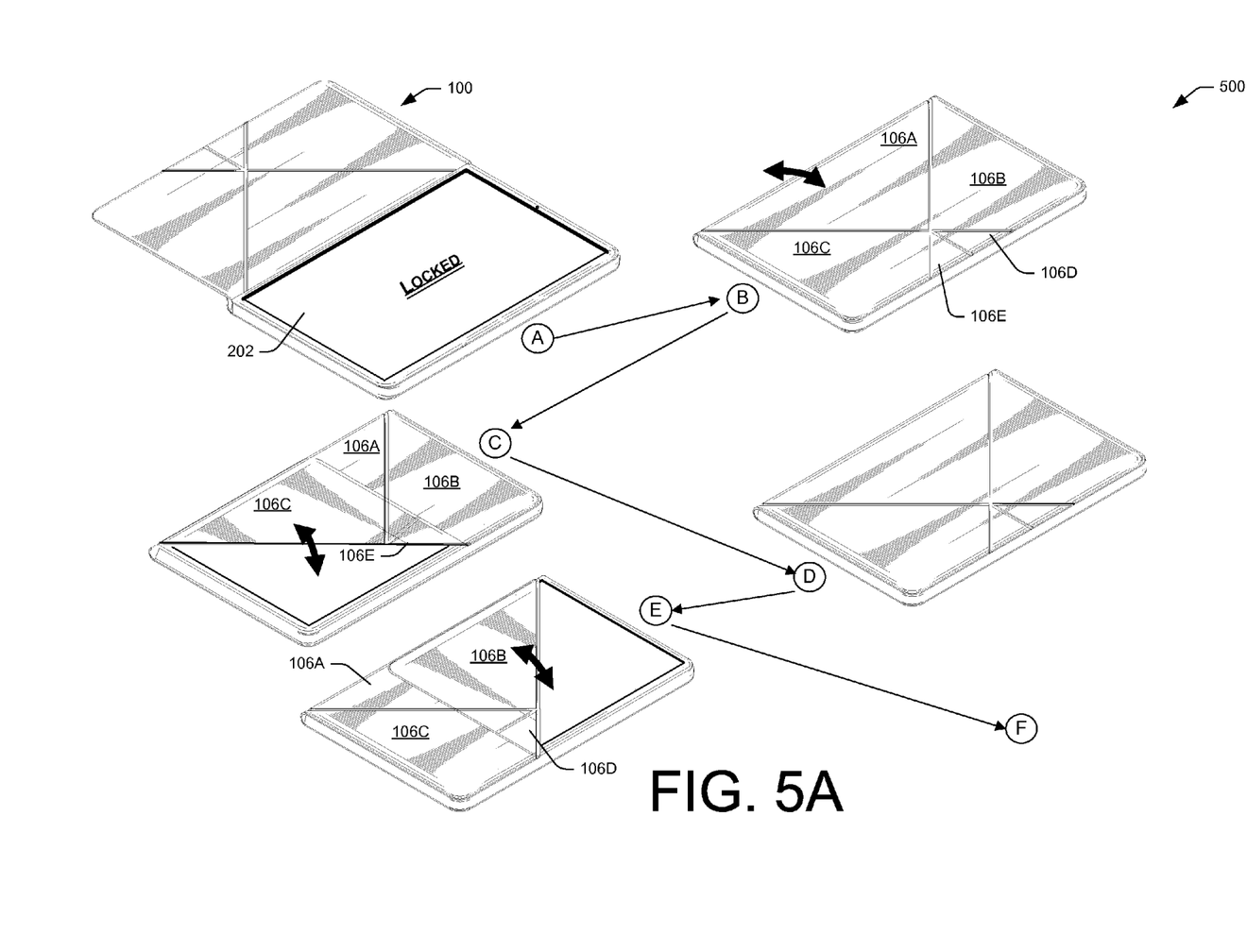
FIGS. 5A and 5B illustrate example operations for altering an electronic device from a locked state to an unlocked state by manipulating a transformable cover.
Figure 5B:
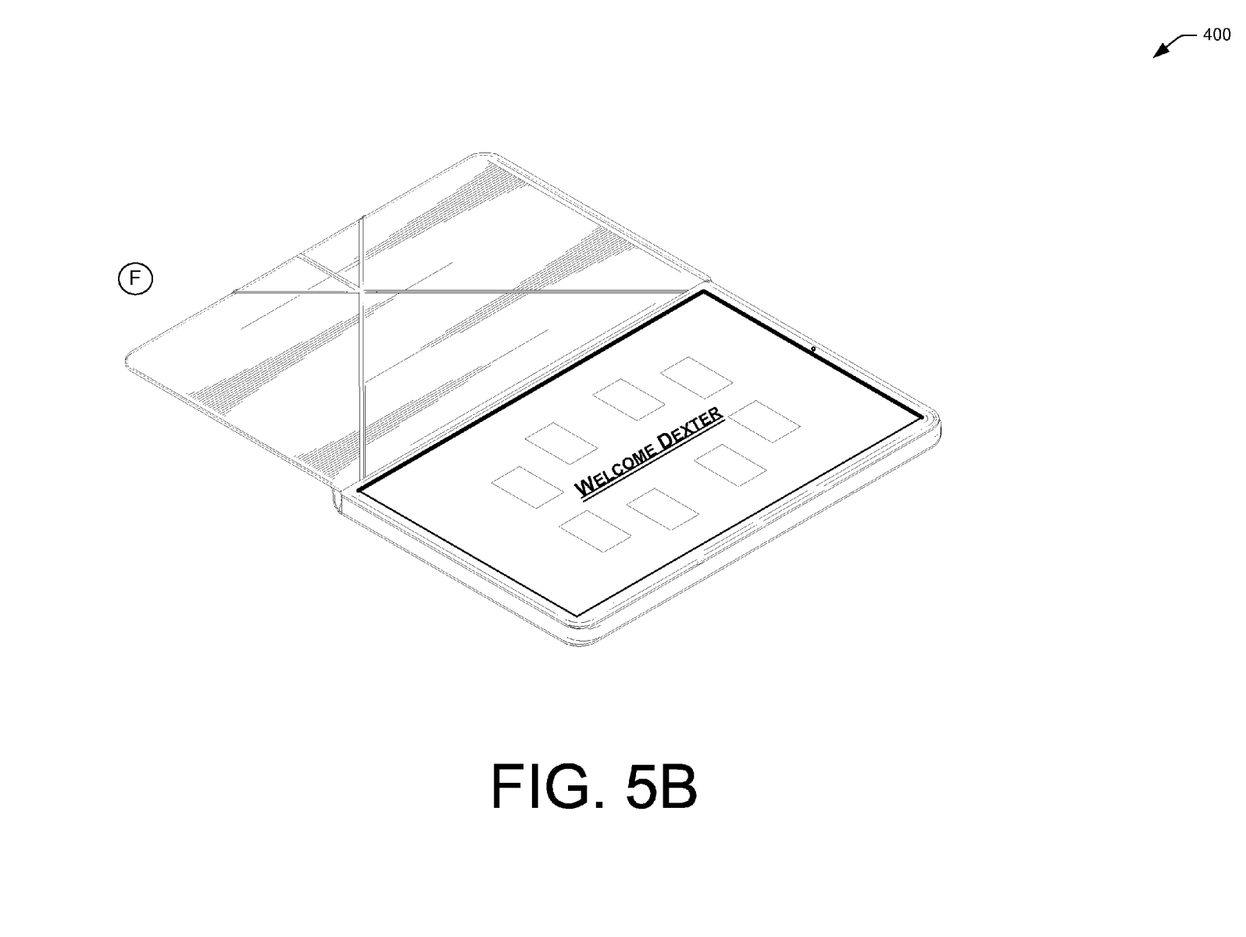

FIGS. 5A and 5B illustrate an example technique 500 for unlocking an electronic device. The technique 500 is illustrated as multiple operations A-F where a user may manipulate one of the multiple flaps on the front surface of the cover in a preset sequence to unlock the electronic device. In some implementations, the present sequence of the multiple operations A-F may be set and stored in the sequence setting module 312 by the user. In other implementations, the present sequence of the multiple operations A-F may be set and stored in the sequence setting module 312 by a device manufacturer. Additionally, the order in which the operations are described is not intended to be construed as a limitation, and any number of the described operations can be combined in any order and/or in parallel with other operations to implement the technique 500 (or any other technique describe herein).

In some implementations, a time period may also be associated with each operation of a sequence and/or the entire sequence and stored in the sequence settings module 312. For example, in some implementations, a user may designate that a particular flip of one of the multiple flaps of the transformable cover within the sequence must be complete or consume two seconds. Additionally or alternatively, a user may designate that the entire sequence (i.e., all flips of the multiple flaps of the transformable cover in the sequence) must be complete or consume five seconds, for example.

In some implementations, the order of operations or sequence may be selected by the user and stored within the sequence settings module 312 of the electronic device 202. In some implementations, the sequence may be changed by the user at any time. Furthermore, the sequence setting module 312 may store a variety of sequences which initiate alternative functionality on the device. For example, one sequence for altering the device from a locked state to an unlocked state and another sequence for opening a specific application (e.g., camera) irrespective of whether the device is in a locked state or unlocked state.

Operation A illustrates an example operation of a sequence. The electronic device 202 is shown in a locked state. As illustrated, the front surface of the transformable cover 100 is pulled open to expose the display screen of electronic device 202. The display screen of the electronic device 202 indicating that the device is locked. In some implementations, a locked electronic device may restrict the functionality of the device and may require the input of an alphanumeric passcode to initiate functionality of the device.

In some implementations, the opening of the entire transformable cover 100 may act as a reset for the sequence determination module 318. In this implementation, the operation of opening the entire cover 100 may clear all previously received indications of operations at the sequence determination module 318 and, therefore, the next indication of an operation received may be the first operation in a stored sequence.

Operation B illustrates an example operation subsequent to operation A of the sequence of technique 500. As shown at operation B, a user may replace the front surface of the transformable cover 100 over the electronic device. In some implementations, operation B may be the starting point of the preset sequence if following the opening of the entire transformable cover 100 as described with regard to operation A. As described above, the transformable cover 100 may be comprised of multiple flaps 106A-E where each may contain one or more magnetic disc which may allow a magnetometer 316 associated with electronic device 202 to detect whether the each of the multiple flaps 106A-E of cover 100 are in an opened state or a closed state.

Operation C illustrates an example operation subsequent to operation B of the sequence of technique 500. At operation C, the flaps on the front surface of the transformative cover may be manipulated. As illustrated, flaps 106C and 106E are flipped up relative to flaps 106A, 106B and 106D to expose a portion of the display screen of the electronic device. In some implementations, the preset sequence may also define a length of time that the flaps 106C and 106E (or any other flaps described herein) are to remain flipped.

In some implementations, the manipulation of flaps on the front surface of the transformative cover may decouple one or more magnetic discs associated with the manipulated flap from the electronic device. In some implementations, the removal of the magnetic discs would be registered by the magnetometer 316. Additionally, the magnetometer 316 may send a signal to the sequence determination module 318 to indicate that the magnetic disc (and flap) has been removed from the electronic device. In some implementations, the sequence determination module 318 may reference this signal (and any subsequent signal) with one or more preset sequences stored in the sequence setting module 312 to determine if the manipulation of the flap is associated with a preset sequence.

As illustrated at operation C, when the flaps 106C and 106E are manipulated, the magnetic disc embedded within the flap 106C is detached from the electronic device. As described above, the detachment would create a signal or "break" received by the magnetometer 316. Subsequently, the sequence determination module 318 may verify that this break is part of a preset sequence stored in the sequence settings module 312.

Operation D illustrates an example operation subsequent to operation C of the sequence of technique 500. Operation D illustrates that flaps 106C and 106E are substantially returned to the position at operation B. In this implementation, the connection between the magnetic disc embedded within the flap 106C and the electronic device would be detected by the magnetometer 316.

Operation E illustrates an example operation subsequent to operation D of the sequence of technique 500. At operation E, flaps 106B and 106D are flipped up relative to flaps 106A, 106C and 106E to expose another portion of the display screen of the electronic device. In this implementation, when flap 106B is flipped up, there may be a change in the magnetic field between the magnetic disc of flap 106B and the electronic device. This change in magnetic field may be detected by magnetometer 316, which in turn may generate a signal corresponding to the change and provide the signal to the sequence determination module 318. In some implementations, the sequence determination module 318 may determine that operation E is the final operation in a preset sequence stored in the sequence setting module 312. As a result, the electronic device may transition from the locked state shown at operation A to an unlocked state shown at operation F shown in FIG. 5B.

In some implementations, the entire sequence described above with reference to operations A-F may be completed within a predetermined period of time (e.g., 5 seconds).

It is to be understood that technique 500 is an example technique for using a transformative cover to unlock an electronic device. Technique 500 is described in relation to operations A-F; however, additional operations (i.e., flips at operations C and/or D) or input (described below) may be added to the preset sequence.

Figure 6A:
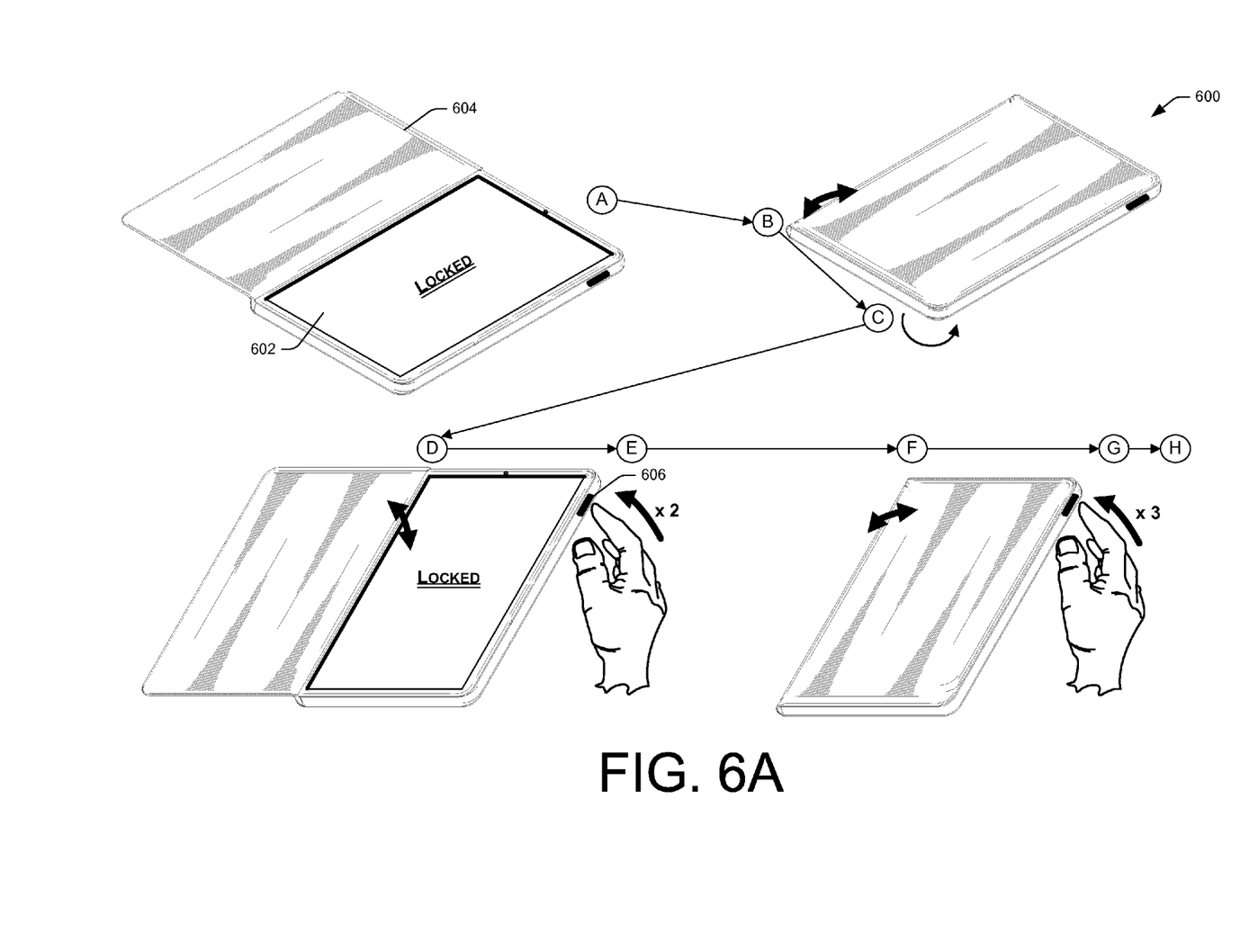
FIGS. 6A and 6B illustrate example operations for initiating a functionality of an electronic device by two or more inputs received in a specific sequence.
Figure 6B:
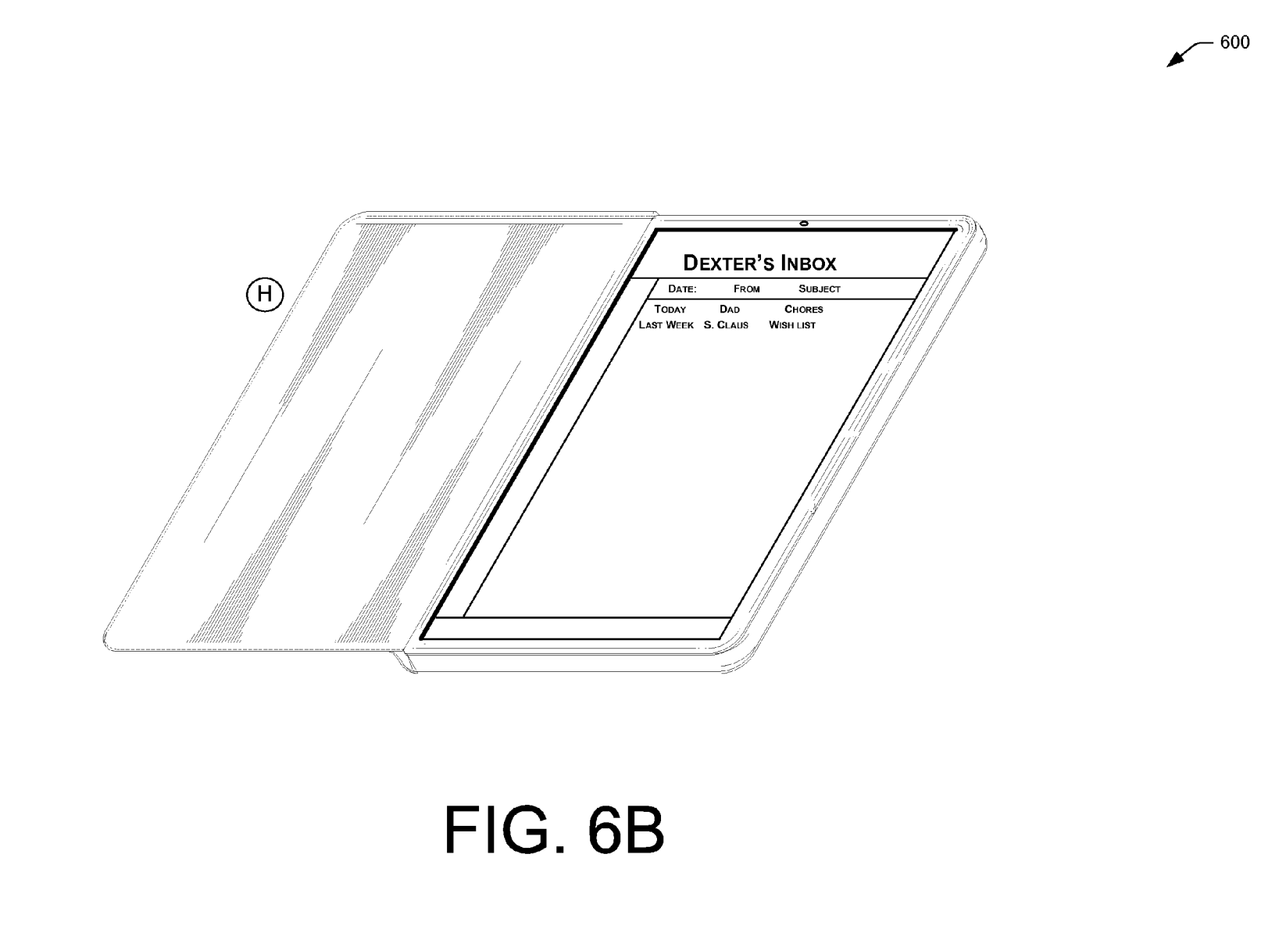

FIGS. 6A and 6B illustrate an example technique 600 for initiating functionality of an electronic device. The technique 600 is illustrated as multiple operations where one or more components of an electronic device 602 may manipulated in a sequence to initiate functionality of the device. The operations A-H as described in technique 600 may comprise a sequence stored in the sequence settings module 312 where each operation corresponds to a step in the sequence.

In some implementations, a time period may also be associated to each operation and/other the entire sequence and stored in the sequence settings module 312. For example, in some implementation, a user may designate that a particular operation within the sequence must be complete or consume two seconds. Additionally or alternatively, a user may designate that the entire sequence (i.e., all operation in the sequence) must be complete or consume five seconds, for example.

In some implementations, the orientation of the electronic device may be an operation or step within a stored sequence. For example, changing the orientation of the device from portrait to landscape may be recognizable to the sequence determination module 318 as a possible operation within a sequence stored in the sequence settings module 312.

Operation A illustrates an example first operation of a sequence, the completion of which initiates a functionality of the electronic device. The electronic device 602 is shown with a cover 604 having a singular flap in an opened position. Furthermore, the electronic device is shown in a "Locked" state where such indication is displayed while the device is in the landscape orientation. As described above, an orientation determination module 318 may determine the orientation of the device 602.

Operation B illustrates an example second operation of the sequence. The second operation illustrate may include closing the single flap of the cover 604. As described above with regard to transformable cover 100, the single flap of cover 604 may contain one or more magnetic disc which may allow a magnetometer 316 associated with electronic device 602 to detect whether the single flap of cover 604 is in an opened state or closed state. In some implementations, the transformable cover 100 as described above may be used in combination with electronic device 602 and technique 600.

Operation C illustrates an example third operation of the sequence where the device 602 may be rotated from the landscape orientation to the portrait orientation. As described above, an orientation determination module 318 may determine a change in orientation of the device 602. In some implementations, the orientation determination module 318 may provide an indication of an orientation change to the sequence determination module 318. In this implementation, the sequence determination module 318 may evaluate the indication to determine if the change in orientation is part of a sequence stored in the sequence settings module 312.

Operation D illustrates an example fourth operation of the sequence where the single flap of the cover 604 may be reopened while the device 602 is in the portrait orientation. As described above, this operation may create a signal detected by the magnetometer 316. In some implementations, the signal is created when the one or more magnetic disc embedded in the single flap of cover 604 are removed from device 602. Furthermore, the signal may be provided to the sequence determination module 318 to evaluate the signal to determine if it is part of a sequence stored in the sequence settings module 312.

Operation E illustrates an example fifth operation of the sequence where a user may provide one or more inputs via an input component 606 (e.g., button) associated with the electronic device 602 while the single flap of the cover 604 remains open. In some implementations, the sequence determination module 318 may receive the one or more inputs to determine whether they are part of a sequence stored in the sequence settings module 312. As illustrated at operation E, the user presses the button on the bezel of device 602 twice. In some implementations, this may send two signals to the sequence determination module 318. In some implementations, in order for the two signals to be considered by the sequence determination module 318, they must be received as inputs within a period of time stored in the sequence settings module 312.

Operation F illustrates an example sixth operation of the sequence where the single flap of the cover 604 may be closed. Again, this operation may create a signal detected by the magnetometer 316. Furthermore, the signal may be provided to the sequence determination module 318 to evaluate the signal to determine if it is part of a sequence stored in the sequence settings module 312.

Operation G illustrates an example seventh and final operation of the sequence where a user may provide one or more inputs on an input component 606 (e.g., button) associated with the electronic device 602 while the single flap of the cover 604 is closed. In some implementations, this operation would send signals as described above with regard to operation E.

In some implementations, once the sequence determination module 318 determines that the most recently received operation is the final operation of a stored sequence in the sequence settings module, the sequence determination module 318 may send a signal to initiate a device functionality associated with the completed stored sequence. For example, as a result of receiving the multiple inputs at operation G, the sequence determination module 318 may determine that a stored sequence is complete and, as a result, initiate a specific functionality associated with the completed stored sequence. As illustrated in FIG. 6B at operation H, the sequence determination module 318 may initiate the specific application (i.e., Dexter's email inbox) on the display of the device 602.

Figure 7:
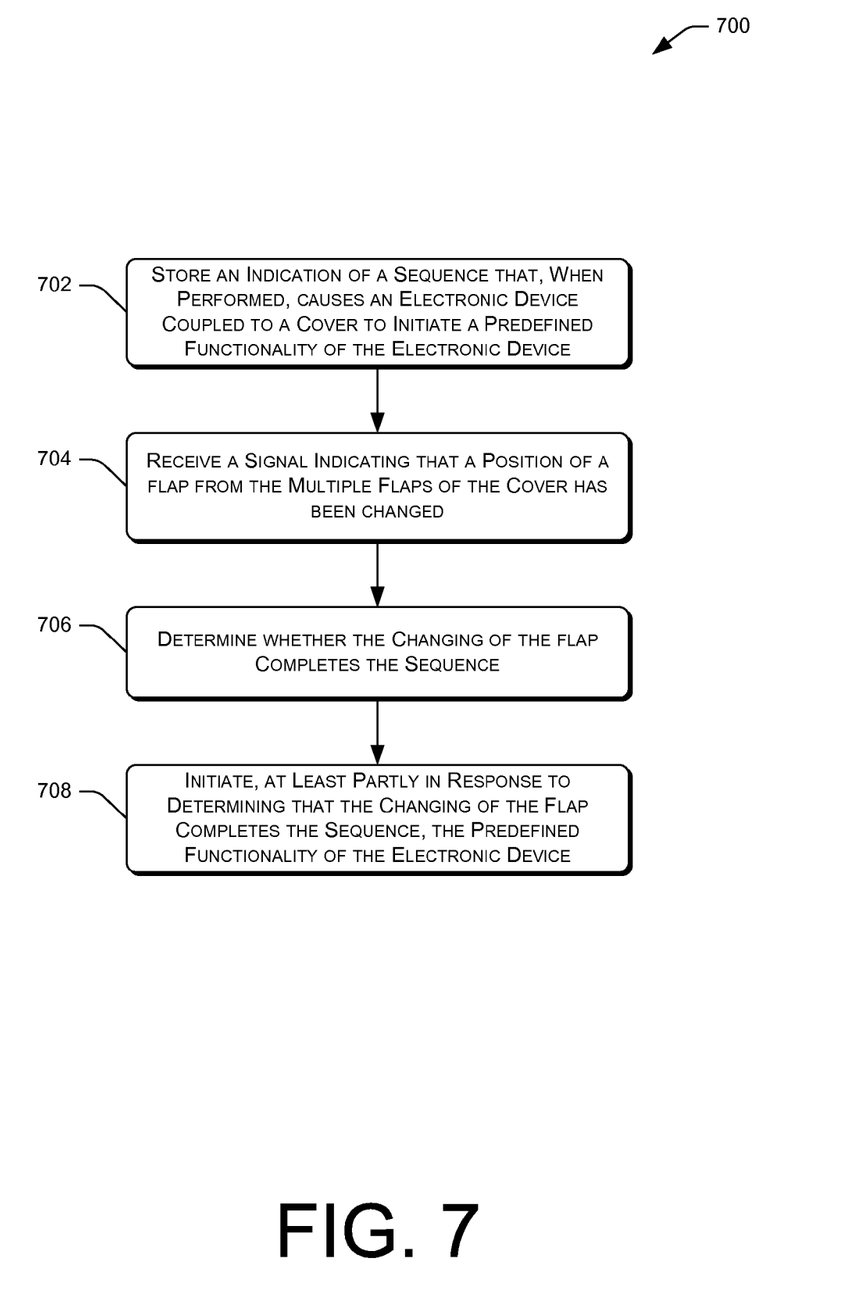
FIG. 7 illustrates an example flow diagram of a process for unlocking an electronic device according to an embodiment of the present invention.

FIG. 7 illustrates an example process 700 for implementing the techniques described above of changing the locked state of an electronic device by determining whether one or more received indications of one or more operations altering a position of a device cover complete a stored sequence. The process 700 is illustrated as a logical flow graph, each operation of which represents a sequence of operations that can be implemented in hardware, software, or a combination thereof. Process 700 may be performed, e.g., by electronic device 202 of FIG. 3. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 700, at 702, causes the electronic device to store an indication of a sequence that, when performed, causes an electronic device coupled to a cover to initiate a predefined functionality of the electronic device. For example, a user may access the sequence setting module 312 to store a sequence that includes multiple flips of one or more flaps on a transformable cover.

At 704, the electronic device receives a signal indicating that a position of a flap from multiple flaps of the cover has been changed. For example, magnetometer 316 and/or orientation determination module 318 may monitor for such indication.

At 706, the electronic device determines whether the changing of the flap completes the sequence. For example, the sequence determination module 318 may evaluate a received indication of one or more operations to determine whether the received indication of the one or more operations completes a stored sequence.

At 708, the electronic device initiates the predefined functionality of the electronic device at least partly in response to determining that the changing of the flap completed the sequence.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media having computer-executable instructions that, when executed by one or more processors, cause the one or more processors to perform actions comprising:
    storing an indication of a sequence for transitioning an electronic device from a locked state to an unlocked state, the sequence comprising two or more operations for changing a position of one or more portions of a cover associated with the electronic device;
    receiving a signal indicating that an operation changing the position of a portion of the cover associated with the electronic device has been performed;
    determining whether the operation is one of the two or more operations of the stored sequence;
    determining whether the operation is a last operation in the sequence; and
    transitioning the electronic device from the locked state to the unlocked state at least partly in response to determining that the operation is the last operation in the sequence.

2. One or more computer-readable media as recited in claim 1, wherein the sequence is associated with a time period within which the two or more operations are to be completed.

3. One or more computer-readable media as recited in claim 1, wherein the cover comprises a front surface including a plurality of substantially planar flaps, each flap in the plurality of substantially planar flaps is configured to flex independently of the other flaps in the plurality of substantially planar flaps, wherein each flap of the plurality of substantially planar flaps comprises a magnet configured to couple with the electronic device.

4. One or more computer-readable media as recited in claim 3, wherein receiving the signal indicating that the operation for changing the position of the cover has been performed comprises receiving a signal indicating that a magnet of one of the flaps from the plurality of substantially planar flaps is decoupled from the electronic device.

5. One or more computer-readable media as recited in claim 1, wherein the storing comprises storing information about a first orientation and a second orientation of the electronic device, the method further comprising, prior to transitioning the electronic device from the locked state to the unlocked state:
    determining a current orientation of the electronic device; and
    determining that the current orientation corresponds to either the first orientation or the second orientation.

6. A method comprising:
    under control of one or more computing systems configured with executable instructions,
    storing an indication of a sequence that, when performed, causes an electronic device coupled to a cover to initiate a predefined functionality of the electronic device, the cover comprising multiple flaps and the sequence comprising two or more operations for changing a position of specified ones of the multiple flaps;
    receiving a signal indicating that the position of a flap, from the multiple flaps of the cover, has been changed;
    determining whether changing the position of the flap completes the sequence; and
    initiating, at least partly in response to determining that changing the position of the flap completes the sequence, the predefined functionality of the electronic device.

7. The method as recited in claim 6, wherein the sequence is defined by a user of the electronic device or by a manufacturer of the electronic device or the cover.

8. The method as recited in claim 6, wherein each operation from the two or more operations has an associated time period within which the operation is to be completed in order to initiate the predefined functionality of the electronic device.

9. The method as recited in claim 6, wherein the sequence is further associated with a time period within which all operations for the sequence are to be completed to initiate the predefined functionality of the electronic device.

10. The method as recited in claim 6, wherein the electronic device is configured to be in a first orientation or a second orientation approximately 90 degrees rotated from the first orientation and the sequence further specifies placing the electronic device in the first or the second orientation, the method further comprising, prior to initiating the predefined functionality:

determining a current orientation of the electronic device; and determining that the current orientation corresponds to either the first orientation or the second orientation.

11. The method as recited in claim 6, wherein the electronic device is configured to be in a first orientation or a second orientation approximately 90 degrees rotated from the first orientation and the sequence further specifies a change in orientation from the first orientation to the second orientation or vice versa, the method further comprising, prior to initiating the predefined functionality:

determining that the orientation of the electronic device has been changed; and determining that the change in orientation corresponds to the change in orientation specified in the sequence.

12. The method as recited in claim 6, wherein each flap of the multiple flaps comprises a magnet configured to couple with the electronic device and each flap of the multiple flaps is configured to flex independently of other flaps of the multiple flaps.

13. The method as recited in claim 6, wherein initiating the predefined functionality of the electronic device comprises at least one of:

transitioning the electronic device from a locked state to an unlocked state;

initiating an input component or an output component of the electronic device; or presenting information via the output component of the electronic device.

14. An electronic device configured to couple to a cover, the electronic device comprising:

one or more processors;

a memory unit;

an input component, coupled to the one or more processors and configured to identify movement of the cover relative to the electronic device;

a sequence setting module, stored in or accessible by the memory unit and executable on the one or more processors, configured to store an indication of a sequence specifying two or more movements of the cover that, when identified by the input component, results in the electronic device initiating a predefined functionality; and a sequence determination module, stored in or accessible by the memory unit and executable on the one or more processors, configured to:

receive an indication, from the input component, indicating occurrence of two or more consecutive movements of the cover relative to the electronic device;

determine that the two or more consecutive movements are part of the sequence; and initiate the predefined functionality of the electronic device based at least in part on determining that the two or more consecutive movements complete the sequence.

15. The electronic device as recited in claim 14, wherein the cover comprises a plurality of flaps and each flap in the plurality of flaps includes a magnet and wherein the input component comprises one of:

a magnetometer coupled to the one or more processors, the magnetometer being configured to detect an interaction between a first magnet of a first flap, from the plurality of flaps, and the electronic device;

a touch sensor coupled to the one or more processors and configured to detect one or more touch inputs from a user;

an orientation determination module, coupled to the one or more processors and configured to identify a change in orientation of the electronic device; or a camera, coupled to the one or more processors and configured to capture a visual image of the user interacting with the cover.

16. The electronic device as recited in claim 14, wherein:

the cover comprises multiple flaps;

each flap of the multiple flaps includes a magnet;

each flap of the multiple flaps is configured to move independently from the other flaps of the multiple flaps; and wherein the two or more consecutive movements represent at least one of:

a number of times that each flap of the multiple flaps has been opened;

an order in which each flap of the multiple flaps has been opened; or a length of time that each flap of the multiple flaps remained open.

17. The electronic device as recited in claim 14, wherein:

the cover comprises a single flap;

the single flap includes multiple magnets; and wherein the two or more consecutive movements comprise at least one of:

a number of times that the single flap has been opened; or a length of time that the single flap remains open.

18. The electronic device as recited in claim 14, wherein the sequence is defined by a user of the electronic device or by a manufacturer of the electronic device.

19. The electronic device as recited in claim 14, wherein the sequence further specifies a time limit for performing the two or more movements.

20. The electronic device as recited in claim 14, wherein initiating the predefined functionality of the electronic device comprises at least one of:

transitioning the electronic device from a first state to a second state;

initiating a component of the electronic device; or presenting information via an output component of the electronic device.

* * * * *